(12) United States Patent
Channapragada et al.

(10) Patent No.: US 11,910,064 B2
(45) Date of Patent: Feb. 20, 2024

(54) METHODS AND SYSTEMS FOR PROVIDING PREVIEW IMAGES FOR A MEDIA ASSET

(71) Applicant: Rovi Guides, Inc., San Jose, CA (US)

(72) Inventors: Srikanth Channapragada, Karnataka (IN); Vikram Makam Gupta, Karnataka (IN); Pooja Srivastava, Bengaluru (IN); Cato Yang, San Jose, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/519,322

(22) Filed: Nov. 4, 2021

(65) Prior Publication Data
US 2023/0132764 A1 May 4, 2023

(51) Int. Cl.
| | |
|---|---|
| H04N 21/472 | (2011.01) |
| H04N 21/431 | (2011.01) |
| H04N 21/84 | (2011.01) |
| H04N 21/44 | (2011.01) |
| H04N 21/439 | (2011.01) |
| H04N 21/45 | (2011.01) |

(52) U.S. Cl.
CPC ... *H04N 21/47217* (2013.01); *H04N 21/4312* (2013.01); *H04N 21/4394* (2013.01); *H04N 21/44008* (2013.01); *H04N 21/4532* (2013.01); *H04N 21/84* (2013.01)

(58) Field of Classification Search
CPC ......... H04N 21/47217; H04N 21/4312; H04N 21/4394; H04N 21/44008; H04N 21/4532; H04N 21/84
See application file for complete search history.

(56) References Cited

U.S. PATENT DOCUMENTS

| | | | | |
|---|---|---|---|---|
| 10,091,149 | B2 * | 10/2018 | Jung | H04L 51/212 |
| 10,643,660 | B2 * | 5/2020 | McIntosh | G11B 27/102 |
| 10,992,719 | B2 * | 4/2021 | DiBello | H04N 21/4722 |
| 11,157,146 | B2 * | 10/2021 | Lee | G06F 3/04847 |
| 11,318,388 | B2 * | 5/2022 | Sherwani | A63F 13/69 |
| 11,722,740 | B2 * | 8/2023 | Dhanwal | H04N 21/44226 |
| | | | | 386/241 |
| 2016/0149956 | A1 * | 5/2016 | Birnbaum | G06F 21/10 |
| | | | | 726/1 |
| 2017/0228781 | A1 * | 8/2017 | Conte | H04N 21/47815 |
| 2022/0150595 | A1 * | 5/2022 | Zimmerman | H04N 21/4396 |
| 2022/0207805 | A1 * | 6/2022 | Anvaripour | G06F 3/04845 |
| 2022/0369004 | A1 * | 11/2022 | Channapragada | |
| | | | | H04N 21/4312 |

* cited by examiner

*Primary Examiner* — Helen Shibru
(74) *Attorney, Agent, or Firm* — Haley Guiliano LLP

(57) ABSTRACT

Systems and methods are provided for generating for display, with a media asset, one or more preview images. If a preview image corresponding to an advanced play position, relative to a current play position, provides a spoiler, an alternative preview image is generated for display.

The alternative image may be a modified version of the original image in which at least a portion is removed or masked, or a replacement image, e.g., an image from another play position, a promotional image, or an indication that the preview image is not displayed. A different alternative image or modification may be used when a subsequent play position has been reached if the unmodified preview image contains a different spoiler, and/or a previous modification is no longer required, e.g., if, at the subsequent play position, the original image is no longer a spoiler, the original image may be used as a preview image.

18 Claims, 10 Drawing Sheets

METHODS AND SYSTEMS FOR PROVIDING PREVIEW IMAGES FOR A MEDIA ASSET

FIELD

The present disclosure is directed to methods and systems that allow users to preview upcoming content in a media asset, and, more particularly, to methods and systems for selectively modifying previews of such upcoming content.

BACKGROUND

Most media players, including media player applications, media platforms, etc., provide a variety of trick-play operations to enable users to navigate through media assets. For example, users can fast-forward, rewind, skip through segments, jump to specific chapters, or perform a "scrubbing" interaction when consuming a media asset. Scrubbing is an interaction in which a user drags their finger, in the case of smartphone devices or the like, or a cursor, in the case of PCs or the like, to change a play position of a currently displayed media asset. Media players commonly include a horizontal slider displayed on a progress bar to enable a user to change the current play position of the media asset being generated for display. In some cases, while the user is dragging the slider or selecting a play position to jump or skip to, the media player may present preview images of the media content corresponding to play positions forward from the current play position of the media asset. For example, the media player may display thumbnail preview images corresponding to the position of a slider and/or other play positions such as the start of scenes or chapters in the media asset.

Where such preview images correspond to play positions forward from a current play position in the media asset, or are part of a media asset that the user has not yet started viewing, the preview images may imply events or plot developments that occur in a portion of the media asset that the user has not yet viewed and, therefore, act as a "spoiler". For example, a user may be watching a repeat showing of a football game and may attempt to skip over the half-time entertainment. If the user is presented with a preview image showing the winning team being presented with a trophy, then the preview image might spoil the user's enjoyment when viewing the second half of the game.

SUMMARY

According to an aspect, there is provided a method comprising generating for display, using control circuitry, a media asset; identifying at least one preview image corresponding to a respective play position in either the media asset or in a series that includes the media asset, where the respective play position is advanced with respect to a current play position in the media asset; determining that an alternative preview image is to be displayed in place of the at least one preview image, based on the current play position and metadata associated with the media asset; and, in response to that determination, generating the alternative preview image for display in place of the at least one preview image. The media asset may be, for example, an audio media asset or a multimedia asset including audio and video components.

In this manner, preview images of forthcoming content within a currently viewed media asset can therefore be provided selectively, by modifying the at least one preview image to remove content relating to content between the current play position and the respective play position corresponding to the at least one preview image. In some embodiments, content that might contain a spoiler regarding content of the media asset between the current play position and the respective play position is removed. Alternatively, or additionally, content that the user might not wish to see because they might find it offensive, upsetting or uninteresting can be removed from the at least one preview image.

In some embodiments, there may be "locked" segments of the media asset that the user cannot preview or is otherwise discouraged from previewing. Segments may be locked for a variety of reasons, for example, where the segment is known to include a spoiler, content that the user might find offensive, or content with an age rating that exceeds the age of a user. The above method may be used to avoid presenting the user with preview images from such a locked segment of the media asset.

The alternative preview image may be obtained by modification of the at least one preview image. The modification may include removing or masking a portion of the at least preview one image. For example, where the media asset is a football game, a portion of a preview image containing a scoreboard may be masked, so that a user viewing the preview image will not be aware of scoring events in the match between the current play position and the respective play position. In another example, the preview image may be replaced with a blank image or with a notification that a preview image is not being displayed.

In yet another example, the alternative preview image may be a replacement image, such as an image corresponding to a different play position in the media asset, a promotional image associated with the media asset. For instance, an alternative preview image may be obtained by selecting an image from a play position within a particular time interval of a respective play position to which the at least one preview image corresponds that does not contain a spoiler or potentially offensive content. In another example, an alternative preview image may be selected from a scene immediately preceding, or following, a scene containing the respective play position.

The determination that the alternative preview image is to be generated for display in place of the at least one preview image may be based on a determination that the at least one preview image contains a spoiler relating to content of the media asset between the current play position and the respective play position.

The method may include, subsequent to the generating for display the alternative preview image, determining that the at least one preview image corresponds to content of the media asset at a respective play position that is advanced with respect to an updated current play position; determining that the at least one preview image is to be displayed in place of the alternative preview image, based on the updated current play position and the metadata associated with the media asset; and generating for display the at least one preview image in place of the alternative preview image. For example, where a modified preview image has been displayed when the user had reached a first play position in the media asset to avoid a potential spoiler, it may be determined, when the user has reached a later current play position, that the unmodified preview image no longer contains a spoiler, based on the user having viewed the content of the media asset up to the updated play position. In this case, subsequent displays of preview images may include the unmodified preview image in place of the modified preview image, since there is no longer a risk of the unmodified preview image providing a spoiler. Accordingly, determining that the at least one preview image is to be displayed, unmodified, may comprise determining, based on the metadata, that the at least one preview image does not contain a spoiler relating to content of the media asset between the updated current play position and the respective play position.

The method may include, subsequent to the generating for display the alternative preview image, determining that a second alternative preview image is to be displayed in place of the alternative preview image, based on an updated current play position and the metadata associated with the media asset; and generating for display the second alternative preview image in place of the alternative preview image. For example, where a modified preview image has been displayed when the user had reached a first play position in the media asset to avoid a potential spoiler, it may be determined, when the user has reached a later current play position, that the alternative preview image contains a different spoiler instead of, or in addition to, a previously identified spoiler, based on the user having viewed the content of the media asset up to the updated play position. In this case, at least some subsequent displays of preview images may include a different preview image in place of the alternative preview image, to avoid the different spoiler.

The metadata may include an indication of a portion of the media asset, wherein determining that the alternative preview image is to be generated for display based on determining that the current play position is within said portion of the media asset. For example, the metadata may indicate a risk of a spoiler between two play positions within the media asset, in which case the control circuitry may determine that a particular preview image is to be modified based on whether the current play position lies between the two play positions indicated by the metadata.

In some embodiments, alternative preview images may be generated for display in place of at least one preview image for reasons other than, or in addition to, avoiding spoilers. For example, preview images may be modified or replaced to avoid presenting a user with content that they might not wish to consume for other reasons. A user might find certain types of content offensive, upsetting, or uninteresting. Accordingly, the method may modify the at least one preview images based on a user preference retrieved from a profile of the user. For example, a user profile may indicate that a user is a child, in which case preview images may be modified to remove content with an adult rating. Similarly, a user profile may indicate that a user dislikes sports programs, in which case a preview image corresponding to a respective play position that is a sports segment may be modified to remove sports-related content or to inform the user that they may prefer to not view the content at the respective play position.

The method may include monitoring, using the control circuitry, user interactions with a media application that ceased playing of segments of previously viewed media assets, determining, using the control circuitry, a user preference corresponding to characteristics of the segments of the previously viewed media assets in which playing ceased, and, using the control circuitry, storing an indication, in the profile, of the characteristics of the segments. The determination that an alternative preview image is to be displayed in place of the at least one preview image may then be based on the metadata indicating that a characteristic of the preview image matches one of the characteristics of the segments. For example, such a user preference may be based on a viewing history that indicates that the user habitually skips or stops playback of content relating to sports. The user preference may be stored in the user profile and, if it is determined that a segment of the media asset relates to sports, then preview images corresponding to respective play positions within that segment may be modified to notify the user of the sports content; modified to notify the user that they might not wish to view, or might wish to skip, the content at those respective play positions; or replaced with another image altogether.

The alternative preview image may be generated for display in conjunction with a progress bar, such as a progress bar used to assist a user to perform an operation that affects the playing of the media asset, such as skipping part of the media asset, jumping to another play position in the media asset, or performing a scrubbing action. Such a progress bar may visually indicate a current play position in the media asset and, optionally, the respective playback positions of the preview images. Play positions having corresponding alternative preview images may be visually distinguished from other play positions. For example, the play positions may be indicated on the progress bar using tick marks, where different attributes, such as color and/or shape, are used to distinguish between play positions with corresponding preview images that may contain potential spoilers or other content that the user might not wish to consume, and other play positions with corresponding preview images.

Alternatively, or additionally, the preview images may be displayed as part of a menu, such as a scene selection menu for the media asset, or in a listing for the media asset.

According to another aspect, there is provided a non-transitory computer-readable medium on which is stored computer-readable instructions for performing any of the above methods.

According to yet another aspect, there is provided an apparatus comprising control circuitry configured to generate for display a media asset; identify at least one preview image corresponding to a respective play position in the media asset that is advanced with respect to a current play position in the media asset; determine that an alternative preview image is to be displayed in place of the at least one preview image, based on the current play position and metadata associated with the media asset; and, in response to determining that the alternative preview image is to be displayed, generate for display the alternative preview image in place of the at least one preview image. In the alternative preview image, at least a portion of the original preview image may be removed, concealed, or replaced. The control circuitry may be configured to perform any of the methods according to the above aspect.

In the methods set out above, the metadata indicating potential spoilers is included in, or else accompanies, the media asset. For example, the metadata indicating potential spoilers may be provided by a content provider, or server, that provides the media asset to user equipment. Such metadata may be generated manually, automatically, or using a combination of automatic and manual techniques. In particular, automatically generated metadata may be reviewed manually, for example, before the media asset is made available for download or streaming to user equipment.

In one example, metadata is generated automatically based on an analysis of the content within the media asset. Second control circuitry at a content provider, server or other source may parse audio data, video data, and/or closed caption data of the media asset. The second control circuitry may then identify, based on the parsed data, an event shown in the media asset at a particular play position, for example, using natural language processing techniques. For example, audio data conveying an audio commentary with a keyword such as "goal," or audio of a cheering crowd may indicate that a goal has been scored in a soccer game shown in the media asset. Similarly, closed caption data may provide text of a commentary on the soccer game and may include such a keyword. The second control circuitry may then add to metadata associated with the media asset an indication that some or all preview images corresponding to play positions subsequent to the particular play position should be modified, to reduce the likelihood of the user being presented with a spoiler of the event. In particular, the metadata may specify a portion of the media asset, and indicate that an alternative preview image should be generated for display in place of one or more preview images when a current play position falls within the specified portion.

Metadata may alternatively, or additionally, be automatically generated by retrieving, from a server, using second control circuitry, text, audio or video data relating to the media asset, such as reviews, discussion, or commentary relating to the content of the media asset in a database, website, online forum or social media page. The retrieved data may then be parsed to identify one or more keywords relating to the media asset. For example, keywords such as "goal", "scored", or "equalized", may indicate that a goal has been scored in a soccer game shown in the media asset. A segment of the media asset related to the identified one or more keywords may then be determined, for example, by determining that metadata for the segment corresponds to the one or more identified keywords. An indication that an alternative preview image should be generated for display in place of a preview image corresponding to a play position within the identified segment may then be added to the metadata.

A system including the apparatus set out above and second control circuitry, for example, control circuitry provided at a content provider, server, or other source, may also be provided.

According to a further aspect, there is provided an apparatus comprising control circuitry configured to retrieve, from a server, data relating to a media asset, and parse the retrieved data to identify one or more keywords relating to the media asset. The database may be a database of plot summaries; a website providing information about media assets, such as the Internet Movie Database; or a website hosting reviews or discussions relating to media assets. The retrieved data may be text, audio or video data.

The control circuitry is further configured to identify, based on metadata, a segment of the media asset related to the identified one or more keywords and add, to the metadata, an indication that a preview image corresponding to a play position within the identified segment may contain a spoiler. The indication may include data identifying a portion of the media asset during which the preview image would potentially provide a spoiler or a portion of the media asset with a particular content rating or other content characteristic, such as content that includes a depiction of violent behavior.

The control circuitry is further configured to provide the media asset and the metadata to a second apparatus, such as a user equipment device. For example, the control circuitry may be configured to send the media asset and the metadata to the user equipment device by streaming, multicasting, or otherwise sending it through a communication network. In another example, the control circuitry may be configured to make the media asset and the metadata available for download by a user equipment device.

The control circuitry may be further configured to repeat the process of retrieving data from the database, or other database, and add indications to the metadata based on the retrieved data. In this manner, the metadata may be updated to take account of reactions to the media asset from viewers. Such updating may be repeated periodically at regular, or irregular, intervals.

According to a yet further aspect, there is provided an apparatus comprising control circuitry configured to parse the media asset to identify one or more keywords relating to the media asset. The data may be audio data, video data, closed caption data, metadata or a combination of two or more of those types of data.

The control circuitry is further configured to identify, based on metadata, a segment of the media asset related to the identified one or more keywords and add, to the metadata, an indication that a preview image corresponding to a play position within the identified segment may contain a spoiler. The indication may include data identifying a portion of the media asset during which the preview image would potentially provide a spoiler or a portion of the media asset with a particular content rating or other content characteristic, such as content that includes a depiction of violent behavior.

The control circuitry may be further configured to retrieve data from a database and add indications to the metadata based on the retrieved data, as described in the previous aspect above. In this manner, the metadata may be updated to take account of feedback from viewers. Such updating may be repeated periodically.

The control circuitry is further configured to provide the media asset and the metadata to a second apparatus, such as a user equipment device. For example, the control circuitry may be configured to send the media asset and the metadata to the user equipment device by streaming, multicasting, or otherwise sending it through a communication network. In another example, the control circuitry may be configured to make the media asset and the metadata available for download by a user equipment device.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems according to the present disclosure selectively provide one or more alternative preview images for a media asset, so that a viewer is less likely to encounter content in the preview images, such as spoilers, offensive content or other content that might impair their enjoyment of the media asset.

Figure 1:
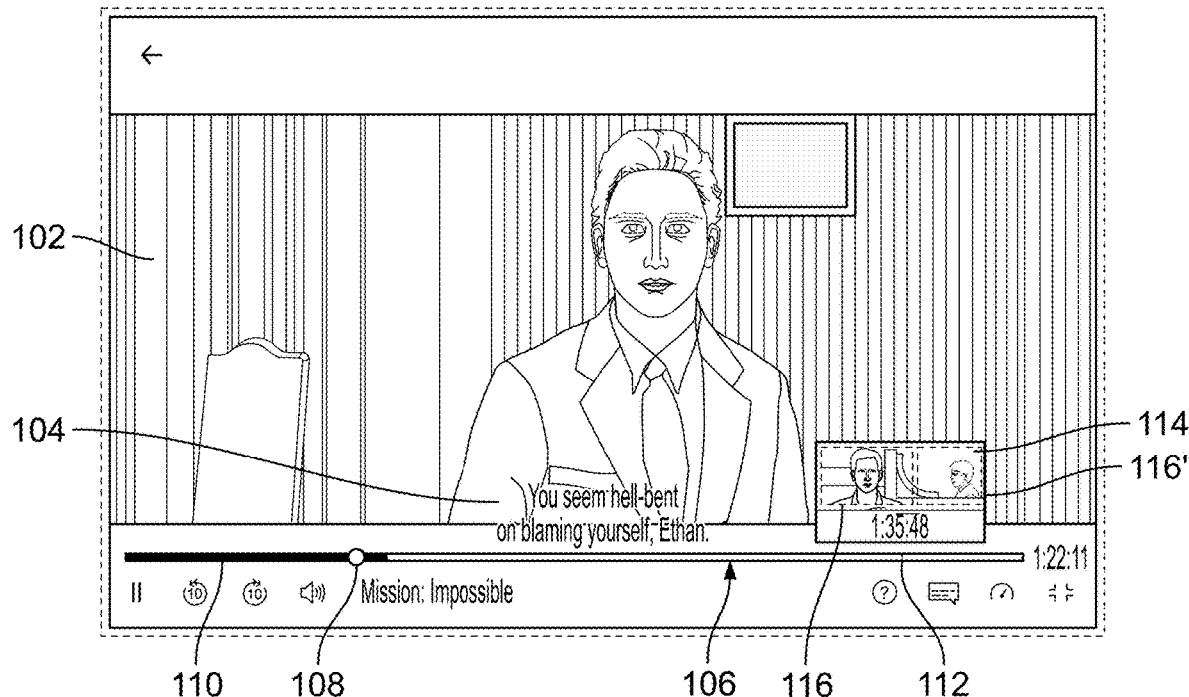
FIG. 1 depicts a display screen including a preview image.

FIG. 1 depicts an example of a display screen 100 displaying a media asset 102. In this particular example, the media asset 102 includes closed caption data 104 and is displayed together with a progress bar 106 that indicates a current play position within the media asset 102. The example progress bar 106 shown in FIG. 1 represents the duration of the media asset 102. In other examples, the progress bar may represent only a part of the duration of the media asset 102. In yet other examples, the progress bar may represent multiple media assets, for example, media assets in a playlist.

A current play position is indicated by a marker 108 and/or the use of different color or shading in a corresponding portion 110 of the progress bar 106. A user may use the progress bar 106 to select a position 112 corresponding to a second play position, for example, by scrubbing through the progress bar, moving a slider or cursor to position 112, or otherwise selecting or highlighting position 112. A preview image 114, such as a thumbnail image corresponding to at least part of a frame of the media asset 102 at the second play position, is then displayed.

When a preview image 114 corresponds to a play position in advance of, in other words, subsequent to, the current play position, it is possible that the preview image 112 may contain a spoiler of the content of the media asset between the current play position and the second play position. For example, a preview image 114 in an episode of a drama may depict a character that reappears unexpectedly in a plot twist in the media asset 102. In another example, where the media asset 102 is a recording of a football game, the preview image might include content that gives the result away, such as a scoreboard or an image of the winning team holding a trophy.

In the example shown in FIG. 1, the preview image 114 might provide a spoiler regarding an event or plot development in the media asset between a first point, corresponding to the current play position, and a second point, corresponding to position 112. For example, the plot of the media asset 102 prior to the current play position may include an apparent death of a character, and that character might unexpectedly return in a plot development occurring between the current play position and second play position. If a portion 116 of the preview image 114 were to include that character, then the display of that preview image 114 prior to that character's return would be a spoiler that might impair the user's enjoyment of the media asset 102.

Figure 2:
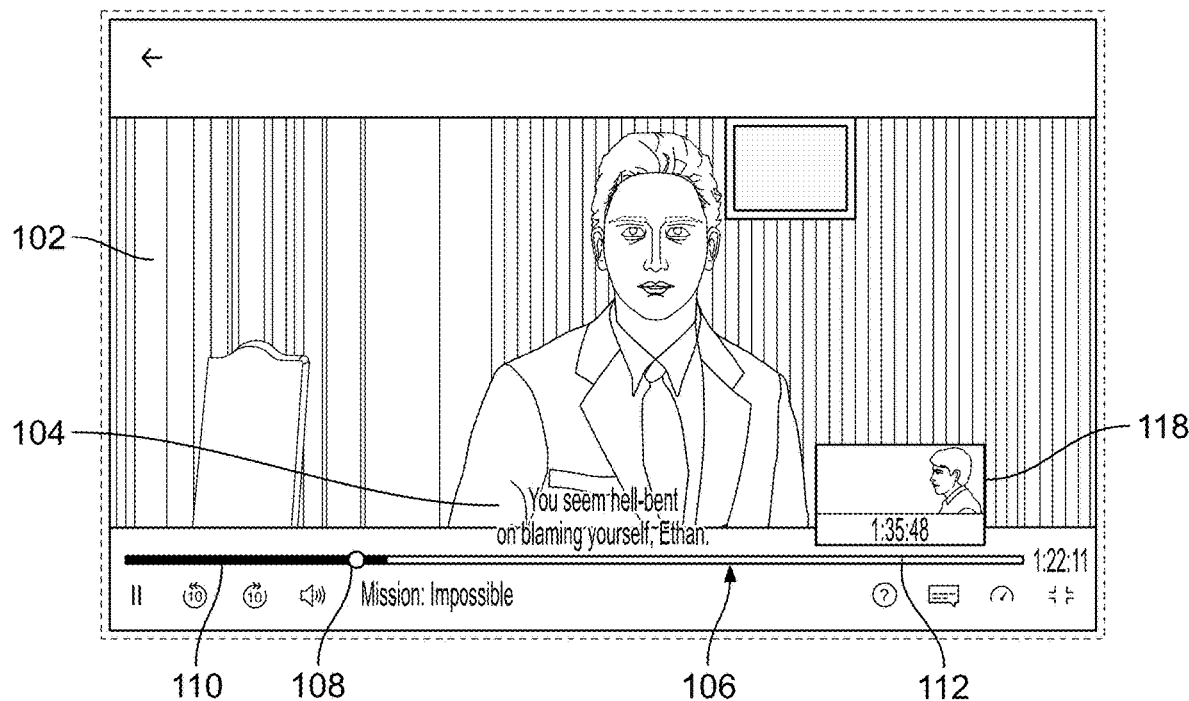
FIG. 2 depicts a display screen according to an embodiment.

FIG. 2 depicts a display screen 200 in a system according to an embodiment. The display screen 200 displays the same media asset 102 shown in FIG. 1 at the same current play position, indicated by marker 108 and shading 110, and an alternative preview image 118 corresponding to the second play position 112. In this particular example, the portion 116 includes an image of a character, and the alternative preview image 118 is a modified version of the preview image 114, obtained by editing the preview image 114 to removing the portion 116 that included that character's image. In the example of FIG. 2, the alternative preview image 118 was obtained by cropping the original preview image 114 to remove the portion 116, so that the alternative preview image 118 corresponds to at least part of another portion 116' of the image 114, where that other portion 116' that does not include the potential spoiler. In other examples, the alternative preview image may be obtained by removing the portion 116, for example, by superimposing a mask or another image, not shown, over the portion 116, or simply by blurring the portion 116.

Figure 3:
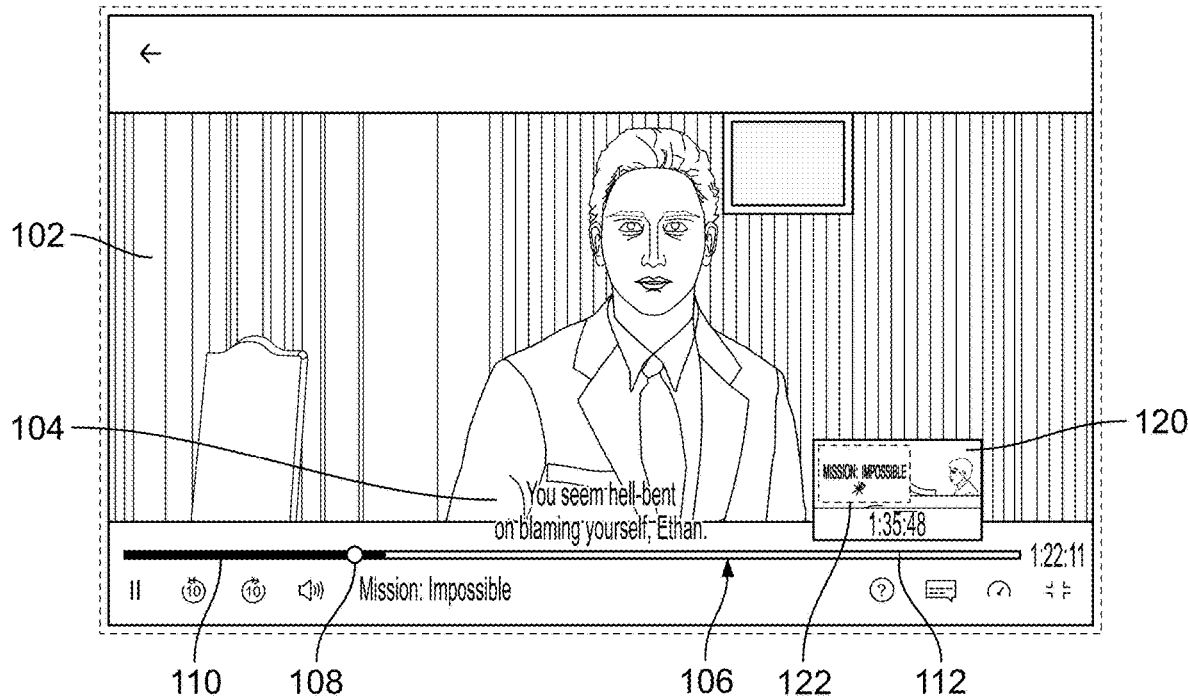
FIG. 3 depicts a display screen according to another embodiment.

FIG. 3 depicts a display screen 300 in a system according to another embodiment, displaying the same media asset 102 shown in FIGS. 1 and 2 at the same current play position, with a different alternative preview image 118 corresponding to the second play position 112. In this example, the portion 116 of the original preview image 114 has been removed by superimposing a mask 122, such as another image, over the portion 116.

In other embodiments, an alternative preview image, not shown, may be obtained by using a combination of cropping and masking to remove the portion 116.

Figure 4:
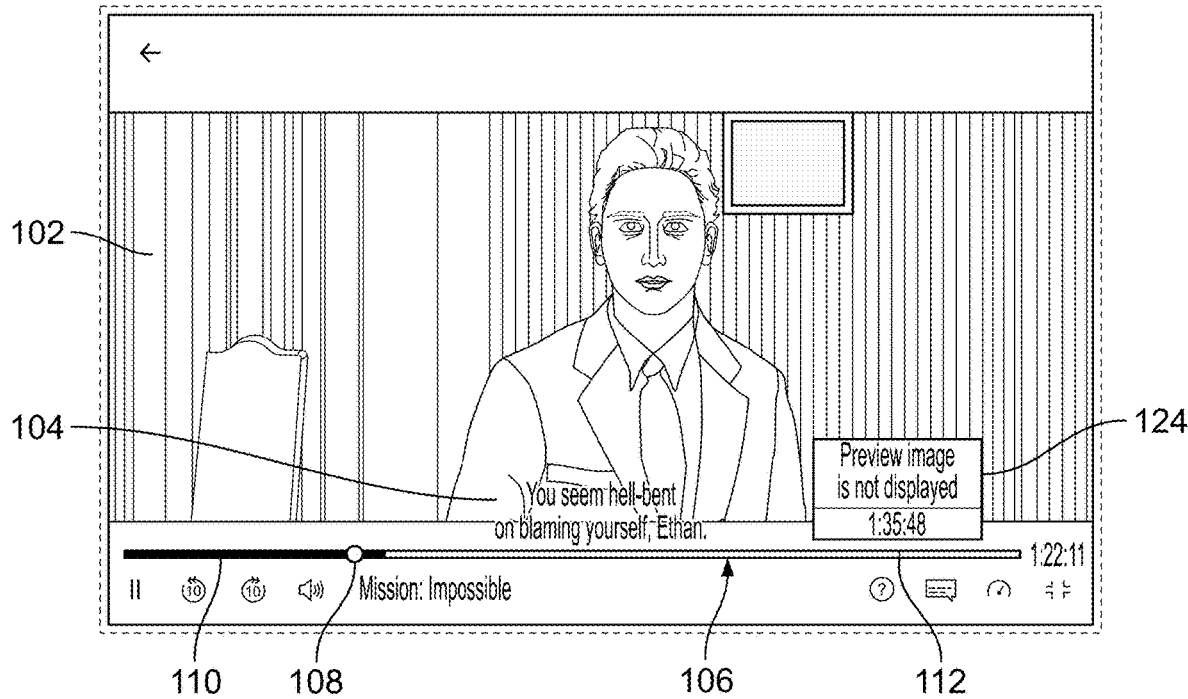
FIG. 4 depicts a display screen according to another embodiment.

In still other embodiments, the alternative preview image may be obtained by replacing or obscuring the entire preview image 114 with another image. FIG. 4 depicts an example display screen 300 in which the alternative preview image is a message 124 notifying a user that the original preview image 114 is not being displayed. In other examples, the original preview image 114 may be replaced with an alternative preview image obtained from a different play position in the media asset. For example, the alternative preview image may be an image from the media asset at a play position within a predetermined time interval of the play position corresponding to the preview image 114, an image from the media asset taken from a scene immediately preceding, or immediately following, the scene containing the play position corresponding to the preview image 114, or from another play position within the media asset, such as an image from a title sequence of the media asset. For instance, if a preview image at a particular play position includes a banner showing a score in a football game, an image from the media asset at a play position within a predetermined number of seconds, or a predetermined number of frames, of the particular play position that does not include the banner may be selected for use as the alternative preview image. In yet another example, the alternative preview image may be a promotional image associated with the media asset; or an image taken from a website, webpage, or social media page associated with the media asset.

Figure 5:
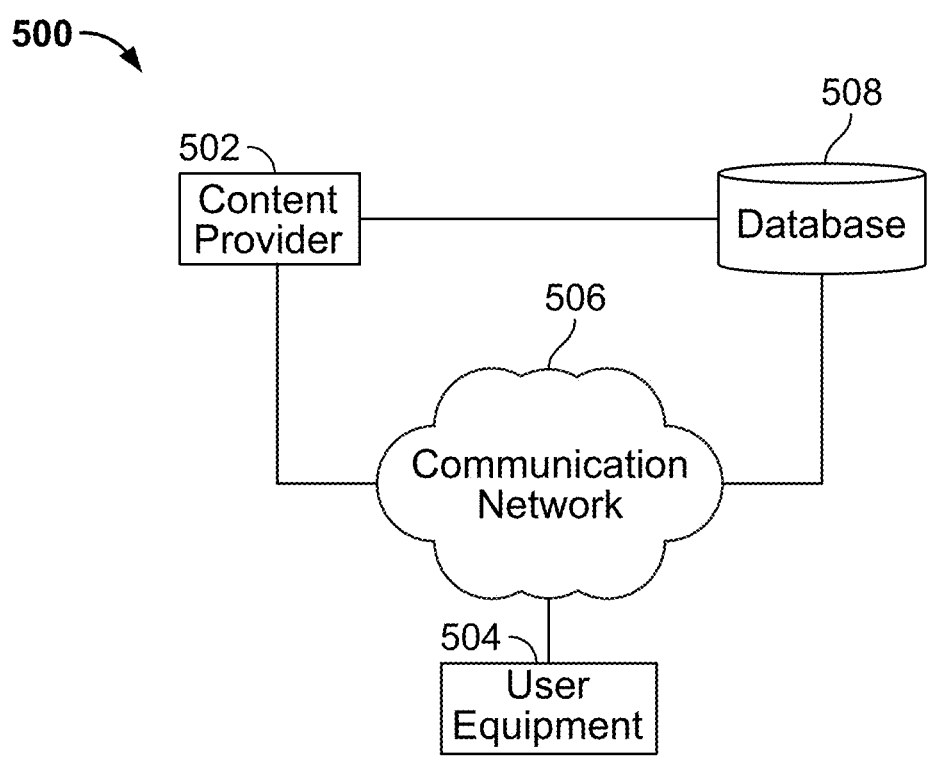
FIG. 5 is a block diagram of a system according to an embodiment.

FIG. 5 depicts a media system 500 according to an embodiment, in which a content provider 502 delivers a media asset to a user equipment device 504 via a communication network 506, such as the Internet or cellphone network. For example, the content provider 502 may make the media asset 102 available for download by the user equipment device 504 in response to a request received from a user. In other examples, the content provider 502 may stream, or send, the media asset 102 to the user equipment device 504 in response to a request. Optionally, the content provider 502 may communicate with a database 508 over a direct communication or via the communication network 506.

The communication network 506 shown in FIG. 5 may be in the form of multiple networks. For example, a communication between the user equipment device 504 and the content provider 502 may be transmitted and received via the Internet, a cellphone network, and/or one or more local area networks, and may utilize wired connections, wireless connections or a combination of wired and wireless connections.

Figure 6:
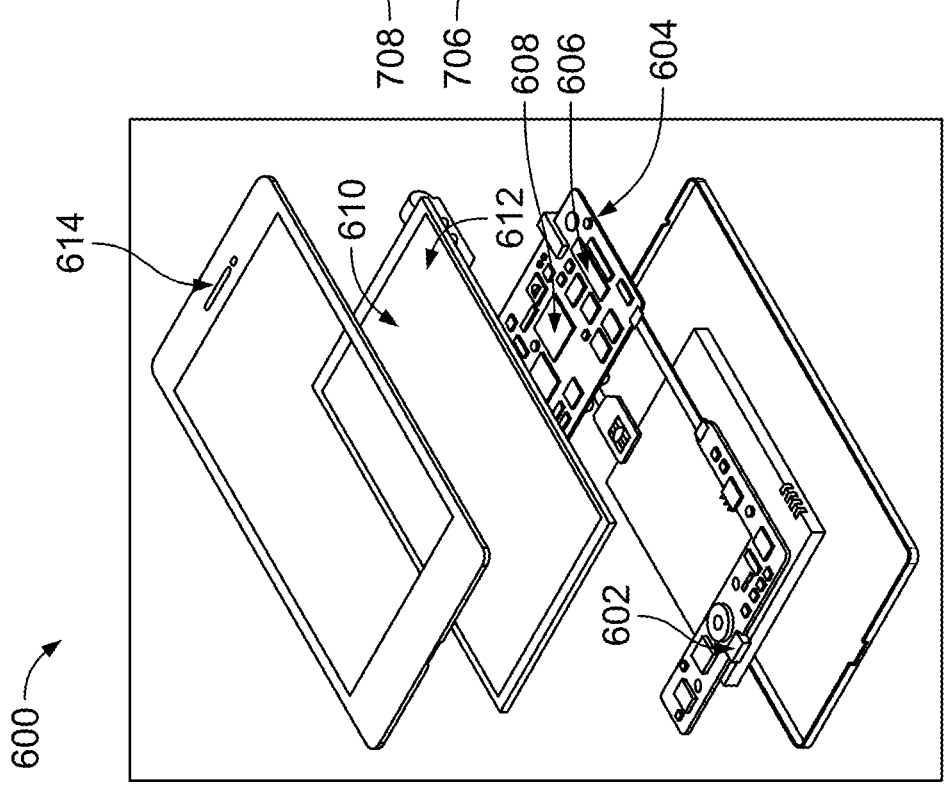
FIG. 6 is an exploded view of a user equipment device according to an embodiment.

FIG. 6 depicts an illustrative example of a user equipment device 600 that may be used to display the media asset 102 and modified, or unmodified, preview images 114, 118, 120, 124. In this particular example, user equipment device 600 is a smartphone. In some other examples, the user equipment device 504 may be a tablet, another wireless communications device, a laptop computer, a personal computer, user television equipment, gaming machine, or other suitable device for accessing content. The user equipment device 600 is configured to receive content and data via input/output (I/O) path 602. I/O path 602 may provide content (e.g., one or more of broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604, and, specifically, processing circuitry 606, to one or more communication networks, such as communication network 506 shown in FIG. 5. I/O functions may be provided via one or more of these communication paths, but are shown as a single path in FIG. 6 to avoid overcomplicating the drawing. The user equipment device 600 also includes a user input interface 610 for receiving instructions from a user, a display 612, and a speaker 614. In this particular example, the display 612 is a touch-screen display that is part of the user input interface 610.

Figure 7:
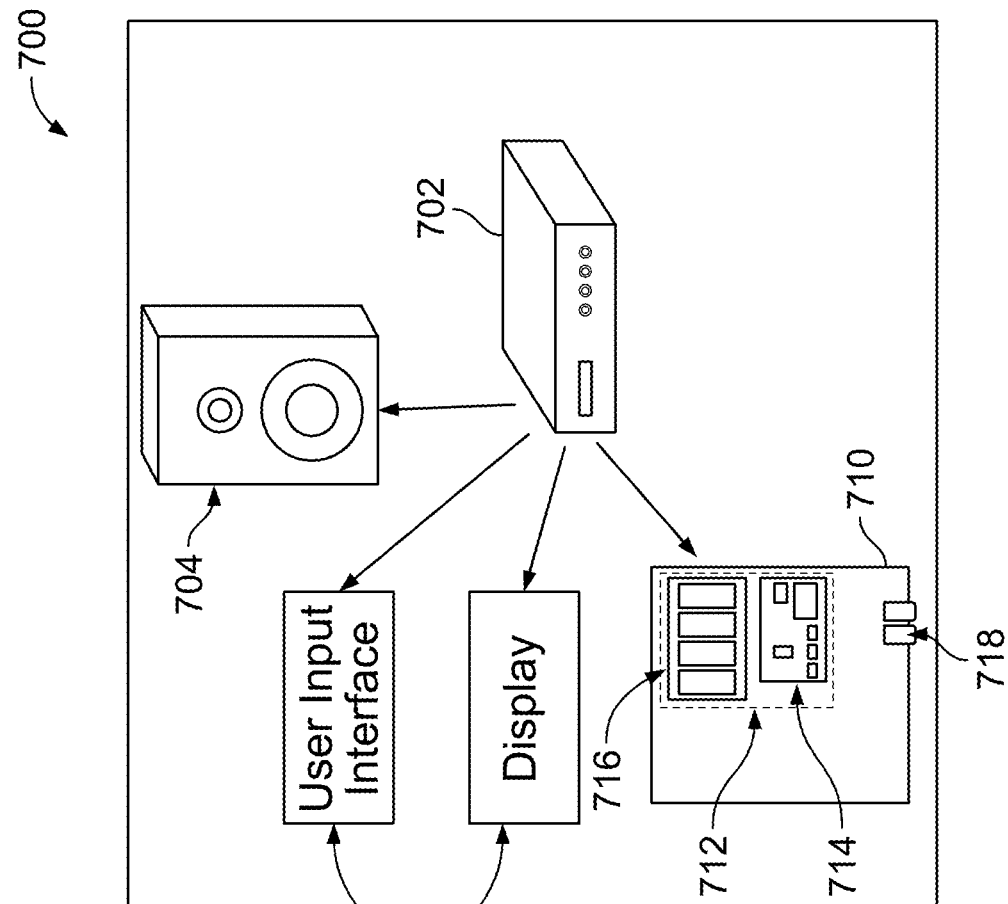
FIG. 7 depicts a user equipment device in an entertainment system according to an embodiment.

FIG. 7 depicts an example of a media system 700, such as a user television equipment system, an in-vehicle entertainment system, or other type of media system. The system 700 includes an alternative user equipment device 702 for displaying the media asset 102 and modified, or unmodified, preview images 114, 118, 120, 124.

In the example shown in FIG. 7, the user equipment device 700 is a set-top box. The set top box 702 may be communicatively connected to one or more speakers 704 and a display 706. In this example, the display 706 is a television display or a computer display. The set top box 702 is communicatively coupled to user interface input 708. In some embodiments, user interface input 708 is a remote control device.

Set top box 702 may include a circuit board 710. The circuit board 710 includes control circuitry 712. The control circuitry 712 includes processing circuitry 714, and storage 716 (e.g., RAM, ROM, Hard Disk, Removable Disk, etc.). The set top box 702 is configured to receive content and data via the I/O path 718.

The control circuitry 604, 712 of the user equipment device 600 or 702 may include any suitable processing circuitry 606, 714. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The control circuitry 604, 712 executes instructions for an application stored in the storage 608, 716. Specifically, control circuitry 604, 712 may be instructed by applications to perform the functions discussed above and below. For example, applications may provide instructions to control circuitry 604, 712 to generate displays. In some implementations, any action performed by control circuitry 604, 712 may be based on instructions received from the applications.

The control circuitry 604, 712 includes communications circuitry suitable for communicating with an application server, networks or servers. In a client-server arrangement, the instructions for carrying out the above-mentioned functionality may be stored on an application server. The communications circuitry may include a cable modem, an integrated services digital network (ISDN) modem, a digital subscriber line (DSL) modem, a telephone modem, Ethernet card, or a wireless modem for communications with other equipment, or any other suitable communications circuitry via the one or more communication networks 506. In addition, communications circuitry may include circuitry that enables peer-to-peer communication with other user equipment devices.

As referred to herein, the phrase "storage" should be understood to mean any device for storing electronic data, computer software, or firmware, such as random-access memory, read-only memory, hard drives, optical drives, or any other suitable fixed or removable storage devices, and/or any combination of the same.

Control circuitry 604, 712 may include video generating circuitry and, optionally, tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604, 712 may also include scaler circuitry for upconverting and downconverting content into the preferred output format of each one of user equipment device 600 or media system 700. The circuitry described herein, including for example, the tuning, video generating, encoding, decoding, encrypting, decrypting, scaler, and analog/digital circuitry, may be implemented using software running on one or more general purpose or specialized processors.

A user may send instructions to control circuitry 604, 712 using the user input interface 610, 708. User input interface 610, 708 may be any suitable user interface, such as a remote control, mouse, trackball, keypad, keyboard, touch-screen, touchpad, stylus input, joystick, voice recognition interface, or other user input interfaces. The display 612, 706 may be provided as a stand-alone device or integrated with other elements of the user equipment device 600 or media system 700. For example, as discussed above in relation to FIG. 6, the display 612, 706 may be a touch-screen or touch-sensitive display. In such circumstances, the user input interface 610, 708 may be integrated with or combined with the display 612, 706. Display 612, 706 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, the display 612, 706 may be HDTV-capable. In some embodiments, display 612, 706 may be a 3D display, and the interactive application and any suitable content may be displayed in 3D. A video card or graphics card may generate the output to the display 612, 706. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604, 712. The video card may be integrated with the control circuitry 604, 712. The speakers 614, 704 may be provided as integrated with other elements of the user equipment device 600 or media system 700 or may be stand-alone units. The audio component of videos and other content displayed on display 612, 706 may be output through the speakers 614, 704. In some embodiments, the audio may be distributed to a receiver, not shown, which processes and outputs the audio via external speakers 704.

The applications may be stand-alone applications implemented on the user equipment devices 600, 702. For example, the application may be implemented as software or a set of executable instructions which may be stored in storage 608, 716 and executed by control circuitry 604, 712 of the user equipment device 600, 702.

In some embodiments, the applications may be client-server applications where only a client application resides on the user equipment device, and a server application resides on a remote server. For example, applications may be implemented partially as a client application on the control circuitry 604, 712 and partially on a remote server as a server application running on second control circuitry of the remote server, such as the content provider 502, shown in FIG. 5, or other server, not shown. When executed by the second control circuitry of the remote server, the application may instruct the second control circuitry of the remote server to generate application displays and transmit the generated displays to the user equipment device 600, 702. The server application may instruct the second control circuitry of the remote server to transmit data for storage on the user equipment 600, 702. The client application may instruct the control circuitry 604, 712 of the user equipment 600, 702 to generate the application displays.

Figure 8:
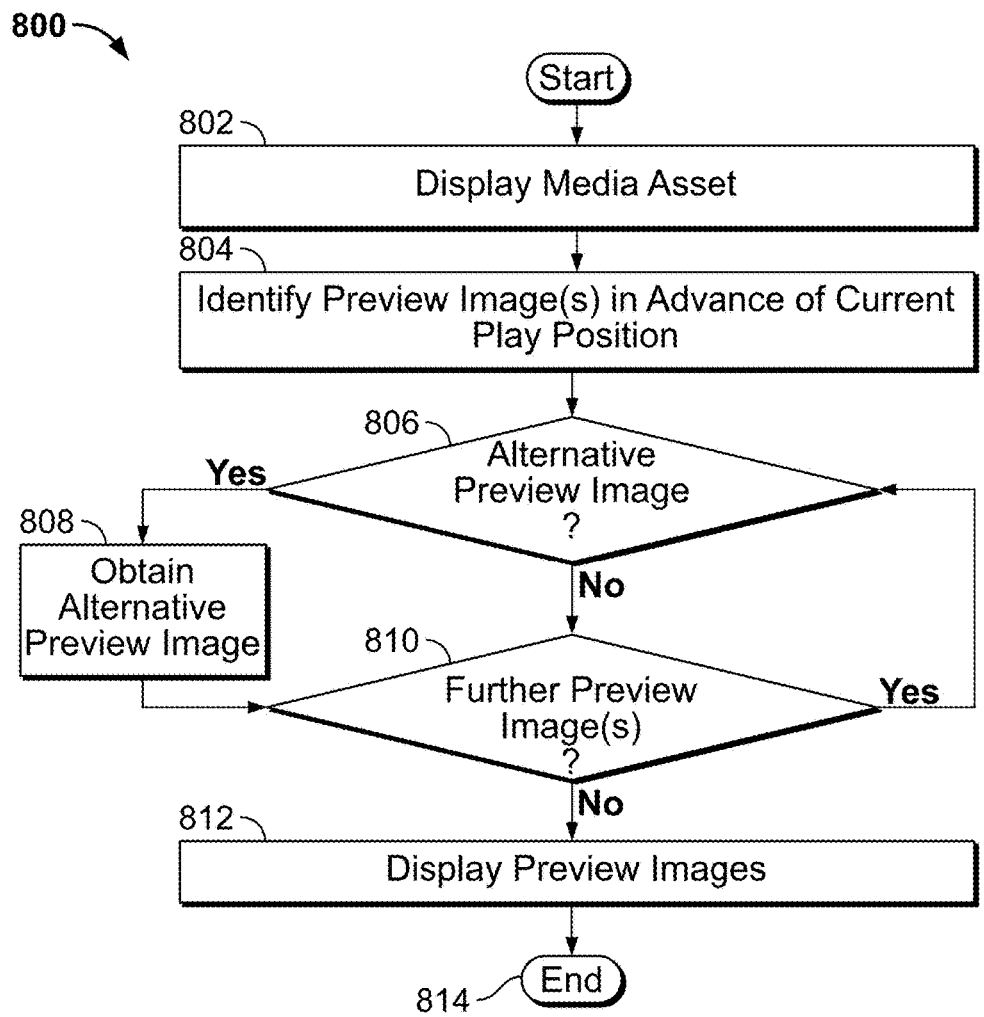
FIG. 8 is a flowchart of a method of providing preview images, according to an embodiment.

FIG. 8 is a flowchart of a process for providing preview images according to an embodiment, that may be performed by the control circuitry 604 of a user equipment device 600. Starting at step 802, the control circuitry 604 causes a media asset 102 to be generated for display (step 802).

The control circuitry 604 then identifies one or more preview images 114 in advance of a current play position (step 804). For example, the identification of the one or more preview images 114 may be performed in response to receiving user input requesting display of a progress bar, a trick-play operation, display of a scene-selection menu, or display of listings of media assets.

In this particular example, the one or more preview images 114 are associated with play positions within the same, currently played, media asset 102 in advance of a current play position. In another example, the media asset might not be currently playing. A user may have interrupted viewing of the media asset 102 previously and be returning to viewing the media asset 102. In other examples, the one or more preview images may relate to preview images from related media assets. For instance, where the media asset 102 is an episode of a series, preview images may be identified based on a current play position, where the current play position may be a currently displayed point of a media asset that is being played, or a position that represents how far the user progressed through viewing a sequence of episodes in the series. It will be understood that the methods of selectively providing alternative preview images described herein are applicable to any of these viewing scenarios.

At step 806, the control circuitry 604 determines whether an alternative preview image is to be generated for display in place of one of the one or more identified preview images. The determination may be based on metadata included in, or accompanying, the preview image 114 or media asset 102 that indicates whether an alternative preview image should be generated for display. For example, the metadata may indicate a period in a running time of the media asset 102 during which the unmodified preview image 114 should not be displayed to the user. For example, the metadata may indicate that the preview image 114 should not be displayed unmodified until the current play position has reached a particular position in the media asset 102 that precedes, or is coincident with, a play position to which the preview image 114 corresponds. Such a position may be indicated in any suitable manner, such as an elapsed time in the playing of the media asset 102, a frame number, or the occurrence of a tag embedded in the media asset 102.

If, at step 806, it is determined that an alternative preview image 114 should be generated for display, then the control circuitry 604 obtains one or more alternative preview images, such as modified images 118, 120, or 124, by removing or replacing at least a portion 116 of the preview images (step 808). As described above in relation to FIGS. 2-4, the portion 116 may be removed by cropping, by masking, or by replacing some or all of the preview image 114 with another image or with a message notifying the user that the preview image is not being displayed. Alternatively, if an alternative preview image 118, 120, 124 has been obtained previously, for example, if the method of FIG. 8 has been performed previously, e.g., in response to an earlier user request for display of a progress bar 106 or menu, then any alternative preview images 118, 120, 124 from that earlier performance may be reused. The alternative preview images 118, 120, 124 may be stored in a memory of, or accessible by, the user equipment device 600 for such subsequent reuse.

If, at step 806, it is determined that the alternative preview image is not needed, then the process continues directly to step 810.

At step 810, the control circuitry 604 determines whether there were any further preview images identified at step 804.

If so, then the control circuitry 604 returns to step 806 and determines whether an alternative preview image should be displayed in place of the next preview image.

If there are no further identified preview images to be analyzed (step 810), then the control circuitry 604 generates the preview image for display (step 812), where any required alternative preview images 118, 120, 124 are generated for display in place of the corresponding unmodified preview images 114. The alternative preview images 118, 120, 124 may be generated for display in conjunction with a progress bar 106 or menu, or in response to a user request for a trickplay operation as discussed above. The process then ends (step 814).

Figure 9:
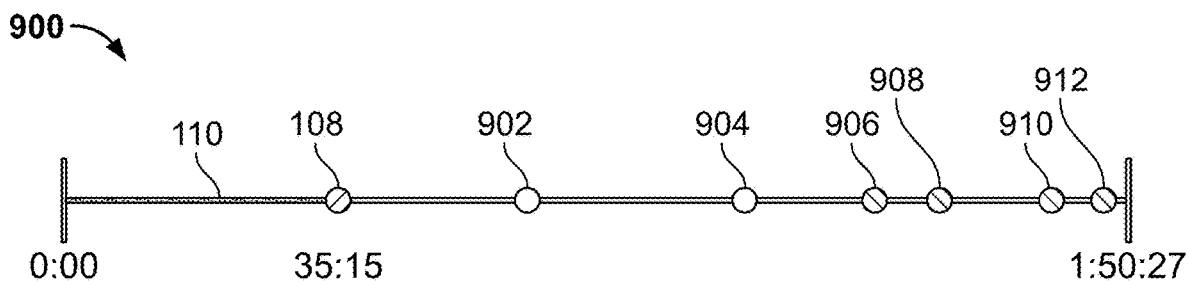
FIG. 9 depicts a progress bar for display according to an embodiment.

FIG. 9 depicts an alternative progress bar 900 that may be displayed by the user equipment device 504. As described above in relation to the progress bar 106 in FIG. 1, the progress bar 900 represents at least part of the duration of the media asset. A current play position is indicated using a marker 108 and/or shading 110.

In the example shown in FIG. 9, preview images are associated with a number of play positions that are after the current play position 108. The play positions that have associated preview images may, optionally, be visually indicated on the progress bar 106. In the example shown in FIG. 9, markers 902, 904, 906, 908, 910, and 912 provide a visual indication of those play positions.

The preview images may be displayed simultaneously, for example, when the progress bar 900 is displayed or in response to a request from a user. Alternatively, an individual preview image may be displayed when the user selects, or hovers over, a part of the progress bar 900 corresponding to one of the play positions or markers 902, 904, 906, 908, 910, and 912.

In this particular example, the markers 906, 908, 910, 912 for play positions with associated preview images that include content that the user might not wish to view are visually distinguished from the markers 902, 904 for other play positions. The markers 906, 908, 910, 912 may be distinguished from the other markers 902, 904 by one or more of different colors, shading, shapes, highlighting or other visual effects. In this manner, the user is made aware that jumping to one of the distinguished play positions 906, 908, 910, 912 and, optionally, viewing the associated preview image, may cause them to see content that might spoil the content of the media asset. Alternatively, such visual indications may be used to highlight play positions having preview images that the user might not wish to view for other reasons, such as a potentially offensive or upsetting image.

Figure 10:
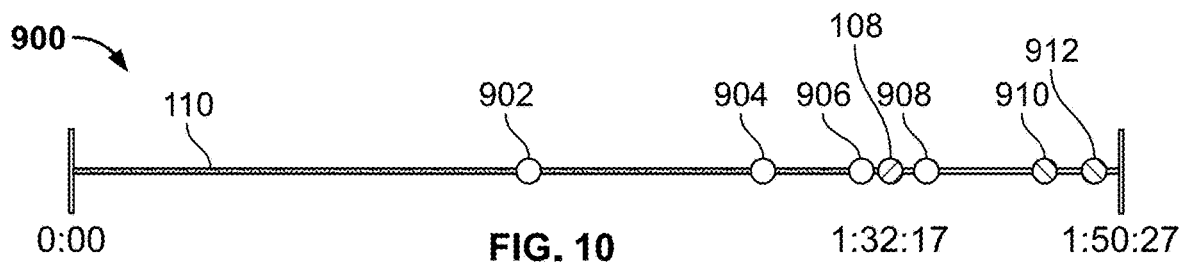
FIG. 10 depicts a progress bar for display according to another embodiment.

In embodiments where alternative preview images are provided to avoid potential spoilers, the potential for a preview image 114 to provide a spoiler may change as the user continues viewing the media asset 102. FIG. 10 depicts the progress bar of FIG. 9 when the current play position has advanced beyond play position 906. In this case, the preview image associated with play position 906 no longer provides a spoiler. In addition, the content of the media asset between the current play position shown in FIG. 9 and the updated current play position shown in FIG. 10 may result in the preview image associated with a later play position 908 no longer providing a potential spoiler. For example, if the media asset 102 is a soccer game and the game is completed at play position 906, then the presentation of a trophy shown at play position 908 would no longer spoil the result of the game. Hence, in the example progress bar 900 shown in FIG. 10, the visual indications distinguishing play positions 906 and 908 to indicate potential spoilers are no longer presented.

Figure 11:
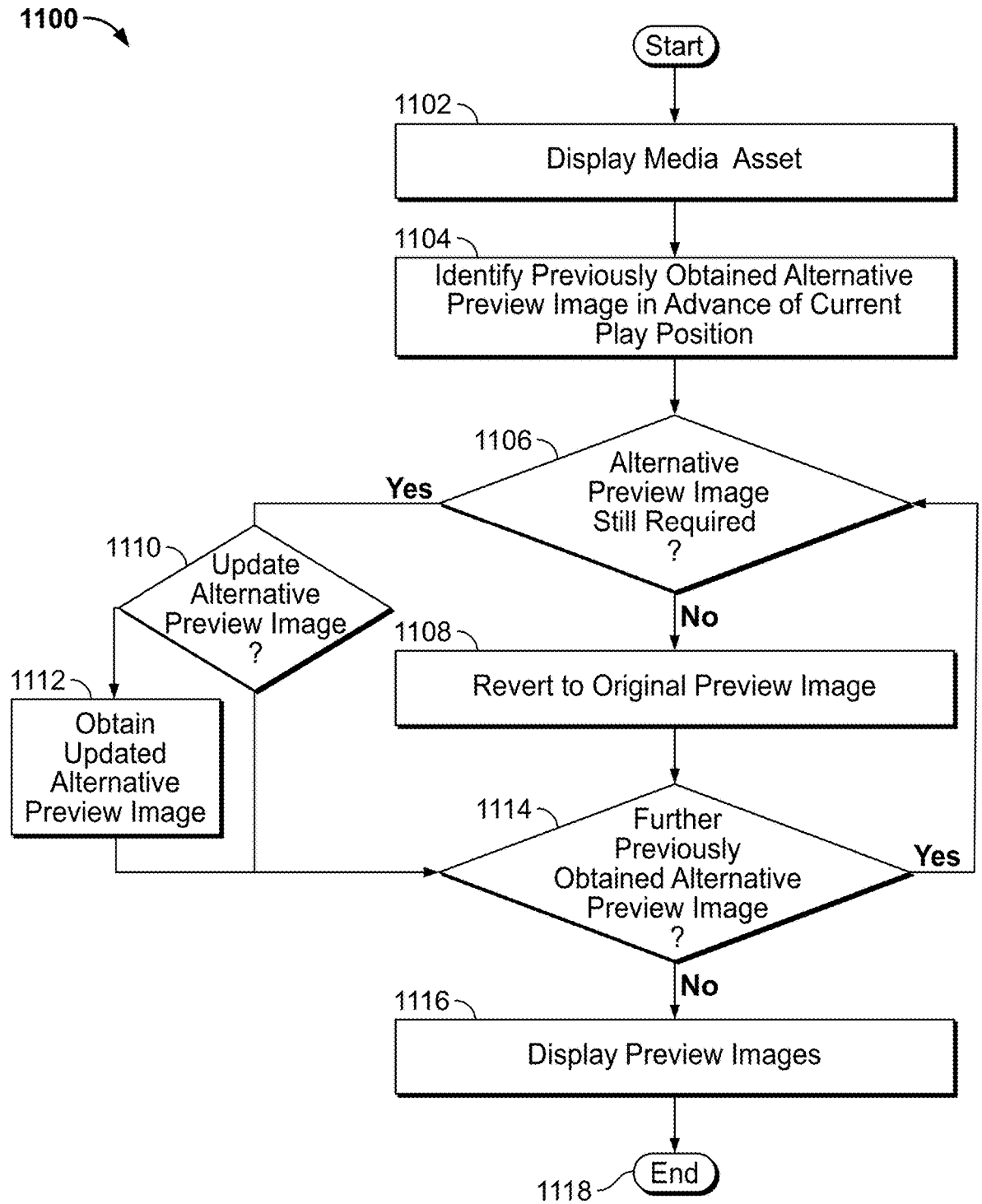
FIG. 11 is a flowchart of a method of selectively modifying preview images, according to an embodiment.

FIG. 11 is a flowchart of a process for updating preview images, according to an embodiment, that may be performed by the control circuitry 604 of a user equipment device 600. Starting at step 1100, the control circuitry 604 causes a media asset 102 to be generated for display (step 1102).

The control circuitry 604 identifies one or more alternative preview images 118 that have been obtained previously for respective play positions in advance of a current play position (step 1104). For example, the identification of the one or more alternative preview images 118 may be performed in response to receiving user input requesting display of a progress bar, a trick-play operation, display of a scene-selection menu, or display of a listings of media assets in a series of media assets. The identification of the alternative preview images may include identifying preview images corresponding to respective play positions in advance of the current play position and then determining whether the preview images 114 corresponding to those play positions have been modified or replaced previously. Such modifications and/or replacements may have been made previously by a process such as that shown in FIG. 8.

As discussed above in relation to the process of FIG. 8, the one or more alternative preview images 118 may be associated with play positions within the same, currently played, media asset 102 that are in advance of the current play position. In another example, the media asset might not be currently playing. A user may have interrupted viewing of the media asset 102 previously and be returning to viewing the media asset 102. In other examples, the one or more preview images may relate to preview images from related media assets. For instance, where the media asset 102 is an episode of a series, preview images may be identified based on a current play position, where the current play position may be a currently displayed point of a media asset that is being played, or a position that represents how far the user progressed through viewing a sequence of episodes in the series.

At step 1106, the control circuitry 604 determines whether an alternative preview image for the respective play position is still required. For example, where an alternative preview image 118, 120, 124 was obtained previously in order to avoid a potential spoiler, the determination of whether the alternative preview image 118, 120, 124 is still required may be based on metadata included in, or accompanying, the preview image 114 or media asset 102 that indicates the alternative preview image should be provided when a current play position is within a particular portion of the media asset. For example, the metadata may indicate a period in a running time of the media asset 102 during which the preview image 114 should be modified or replaced before being displayed to the user. For example, the metadata may indicate that the preview image 114 should not be displayed unmodified until the current play position has reached a particular position in the media asset 102 that precedes, or is coincident with, a play position to which the preview image 114 corresponds. Such a position may be indicated in any suitable manner, such as an elapsed time in the playing of the media asset 102, a frame number, or the occurrence of a tag embedded in the media asset 102.

If, at step 1106, it is determined that an alternative preview image is longer required, then the control circuitry 604 reverts to the original, unmodified preview image 114 for generating for display (step 1108). In embodiments where alternative preview images 118, 120, 124 were produced previously and stored by the user equipment device 600, the alternative preview images 118, 120, 124 that are no longer needed may be deleted from the storage within, or accessible by, the user equipment device 600.

If, at step 1106, it is determined that an alternative preview image is still required, then the control circuitry 604 may, optionally, determine whether an updated alternative preview image is required (step 1110). For example, the preview image 114 shown in FIG. 1 has a portion 116 that includes a depiction of a particular character that is cropped out of the alternative preview image 118 shown in FIG. 2. It may be determined, at step 1106, that the portion 116 no longer contains a spoiler, but the depiction of another character in another portion 116' of the preview image 114 contains a different spoiler, and so an updated alternative preview image is required (step 1110). In another example, it may be determined that both portions 116, 116' of the preview image 114 contain spoilers and an updated alternative preview image is required in which at least both portions 116, 116' are hidden from view.

If it is determined, at step 1110, that an updated alternative preview image is required, then the updated alternative preview image is obtained (step 1112). For example, if it is determined that the portion 116 of preview image 114 no longer contains a spoiler but the other portion 116' does contain a spoiler, then an updated alternative preview image may be obtained by editing the preview image 114 to remove, mask, or replace at least the other portion 116'. In another example, if it is determined both portions 116, 116' of the preview image 114 contain spoilers, an updated alternative preview image may be obtained in which both portions 116, 116' are hidden by any of removal, masking, or replacement, by editing the preview image 114 or the existing alternative preview image 118.

If it is determined that the alternative preview image is still required (step 1106), or after reverting to the original preview image 114 for display (step 1108), or updating the alternative preview image, if required (step 1112), the process continues to step 1114. At step 1114, the control circuitry 604 determines whether there were any further previously obtained alternative preview images identified at step 1104. If so, then the control circuitry 604 returns to step 1106 and determines whether a previous modification to the next modified preview image 118, 120, 124 is still required (step 1106).

If there are no further identified play positions for which an alternative preview image has been obtained to be analyzed (step 1114), then the control circuitry 604 generates the preview images for display (step 1116). The preview images 114, 118, 120, 124 may include any permutation of unmodified preview images 114, alternative preview images 118, 120, 124, and updated alternative preview images, depending on the result of the analysis in step 1106. The preview images 114, 118, 120, 124 may be generated for display in conjunction with a progress bar 106 or menu, or in response to a user request for a trickplay operation, as discussed above. The process then ends (step 1118).

The example embodiments discussed above emphasized the provision of alternative preview images to avoid potential spoilers. In some other embodiments, the methods of FIGS. 8 and 10 may be used to provide alternative preview images selectively, in order to avoid display of content that the user might find offensive, uninteresting, or upsetting. In such embodiments, the control circuitry 604 may determine whether an alternative preview image is required in step 806 based on a comparison of characteristics of a segment of the media asset that includes the play position with user preferences. Such characteristics may be indicated by the metadata associated with the media asset. The characteristics may include, for example, content rating, an indication of a depiction of violence, or an indication of strong language. Other examples of characteristics include a genre of the segment, or a topic discussed or otherwise included in the segment. In order to perform the comparison, the control circuitry 604 may retrieve the user preferences from a user profile and/or determine the user preferences based on a viewing history of the user.

Figure 12:
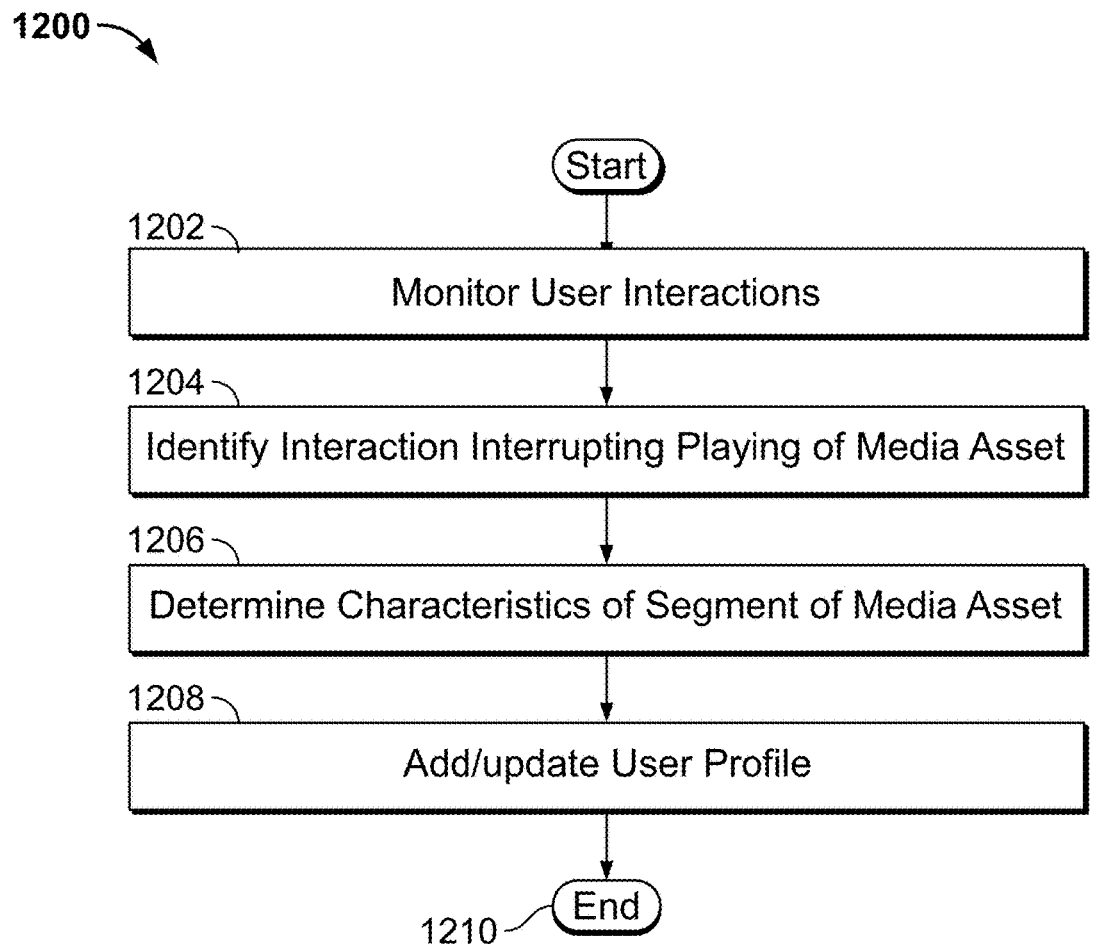
FIG. 12 is a flowchart of determining user preferences for use in providing preview images, according to an embodiment.

FIG. 12 depicts an example of a method for determining user preferences for use in such a comparison. The method of FIG. 12 may be performed by control circuitry 604 of one or more user equipment devices on which a user consumes media content.

Starting at step 1200, the control circuitry 604 monitors user interactions with the user equipment device 600 (step 1202), such as commands given to a media player application implemented on the user equipment device 600. The control circuitry 604 may monitor the user interactions by tracking instructions received through the user input interface 610, and/or monitoring or reviewing a user's viewing history.

The control circuitry 604 identifies, in the monitored user interactions, an interaction that interrupts the user's consumption of a media asset (step 1204). For example, an interaction that stops the playing of a media asset, leaves the media player application, or switches to another media asset, or channel, may be identified. Optionally, the control circuitry 604 may determine whether playing of the media asset was resumed within a given period of time, for example, one day. If playing of the media asset was resumed within that period of time, then the control circuitry 604 may disregard the identified interaction and return to monitoring the user interactions at step 1202.

At step 1206, the control circuitry 604 determines a segment of the media asset that was playing when the identified interaction occurred and the characteristics of that segment. For example, the control circuitry 604 may derive, from the viewing history, an elapsed time of the media asset at the point where the user interrupted play, and identify the segment based on that elapsed time. The elapsed time may be determined based on a difference between a time at which the interruption occurred and a time at which playing of the media asset began. The characteristics of the segment may be determined based on metadata associated with the media asset and/or segment, or from information obtained from databases 508 or websites. For example, if the media asset is a broadcast or multicast program, a characteristic of the segment might be determined based on social media posts mentioning the media asset that were published at, or soon after, the interruption.

At step 1208, the control circuitry 604 updates a user profile by adding, or updating, one or more preferences corresponding to the characteristics of the segment, as an indication of content that the user dislikes, completing the process (step 1210).

The user preference may then be used for determining whether an alternative preview image should be provided (FIG. 8, step 806). The user profile may include an indication of a strength of the user preference, for example, based on how many times the user has interrupted viewing of a media asset during a segment having a particular characteristic, in which case the determination of whether to provide an alternative preview image may disregard a user preference with a strength that does not meet a threshold.

Figure 13:
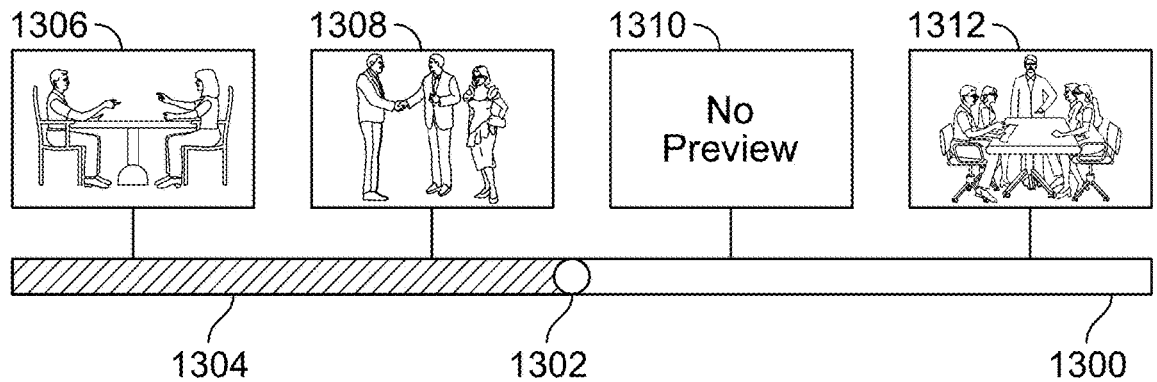
FIG. 13 depicts a progress bar for display according to yet another embodiment.

FIG. 13 depicts an alternative progress bar 1300, according to an embodiment. In this particular example, the current play position is indicated by a marker 1302 and shading 1304. Multiple preview images 1306, 1308, 1310, 1312 are displayed at positions corresponding to respective play positions in the media asset, where a preview image corresponding to one of those play positions has been replaced with an alternative preview image 1310. In this particular example, the alternative preview image 1310 is in the form of a message. Such a progress bar 1300 with multiple preview images 1306, 1308, 1310, 1312 may be displayed in response to a user request. For example, if a user is requesting a jump to a different play position in the media asset.

Figure 14:
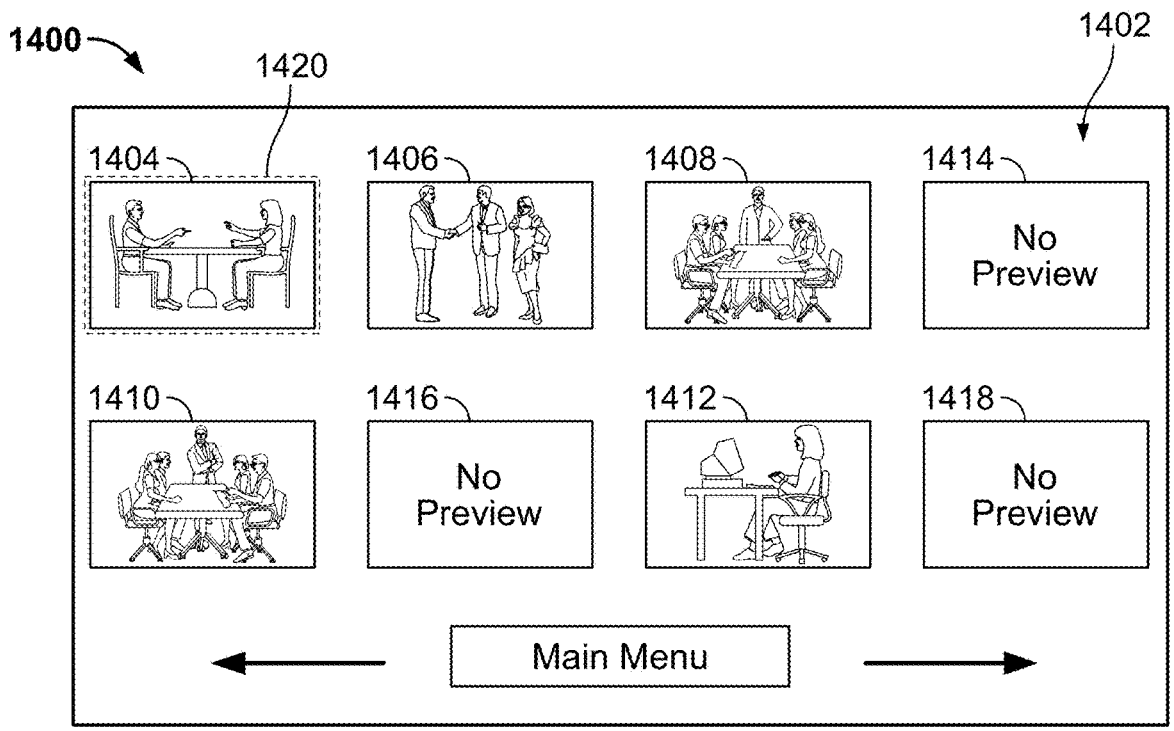
FIG. 14 depicts a scene selection menu for display in an embodiment.

FIG. 14 depicts a display screen 1400 showing a scene selection menu 1402, according to an embodiment. The scene selection menu 1402 includes multiple preview images 1404-1418, in which alternative preview images 1414, 1416, 1418 replace preview images that might contain spoilers, based on a current play position, or potentially offensive or upsetting content. In this particular example, the alternative preview images 1414, 1416, 1418 provide a notification.

Figure 15:
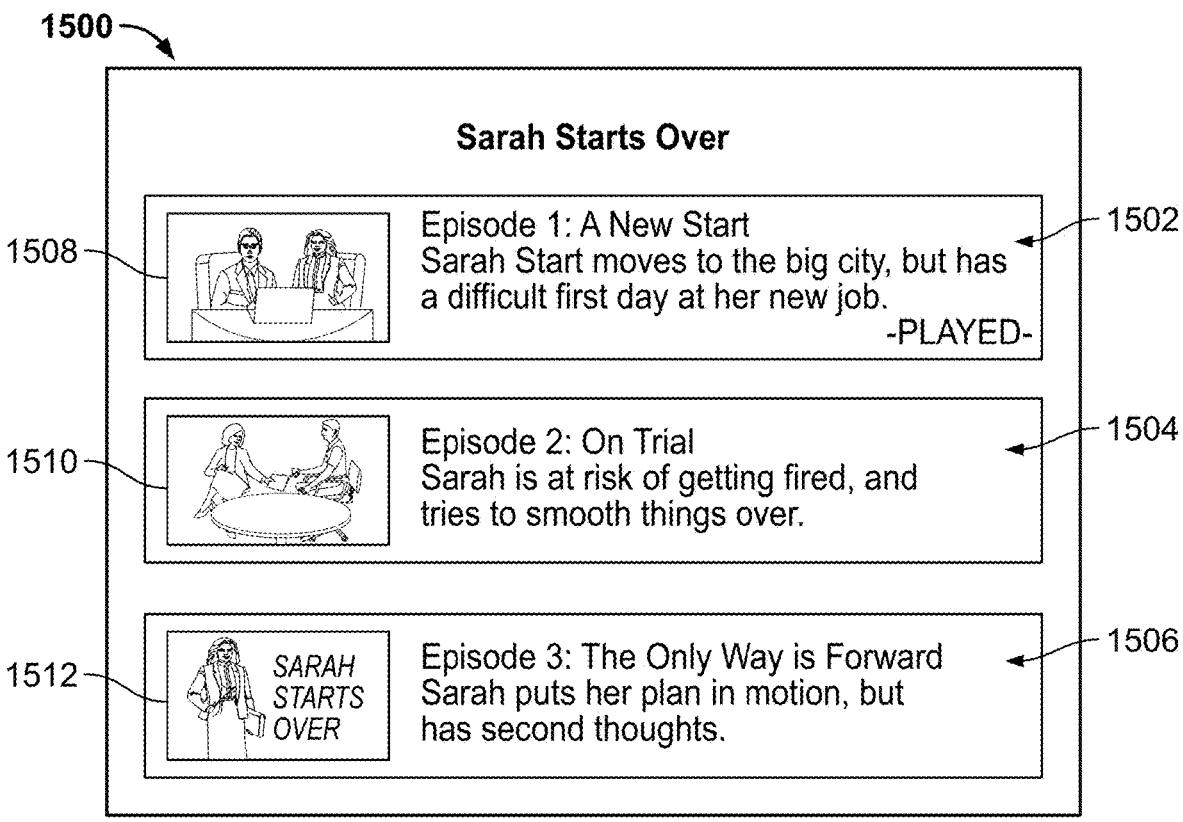
FIG. 15 depicts an episode selection menu for display in an embodiment.

FIG. 15 depicts a display screen 1500 showing media asset listings 1502, 1504, 1506, with corresponding preview images 1508, 1510, 1512. Here, the media assets are episodes in a series, and the user has only viewed episode 1. The control circuitry 604 has determined that an alternative preview image 1512 should be provided in place of the original preview image for episode 3 (FIG. 8, step 806), because the original preview image could potentially be a spoiler for plot developments in episode 2. In this particular example, the preview image for episode 3 has been replaced its content with alternative preview image 1512, such as a promotional image or image from the title sequence for the series. If the user returns to the display screen 1500 after watching episode 2, then the control circuitry 604 may determine that the replacement of the original preview image for episode 3 no longer required (FIG. 11, step 1106), and may revert to the original unmodified preview image (FIG. 11, step 1108) in place of the alternative preview image 1512 when re-displaying the listings 1502, 1504, 1506.

Figure 16:
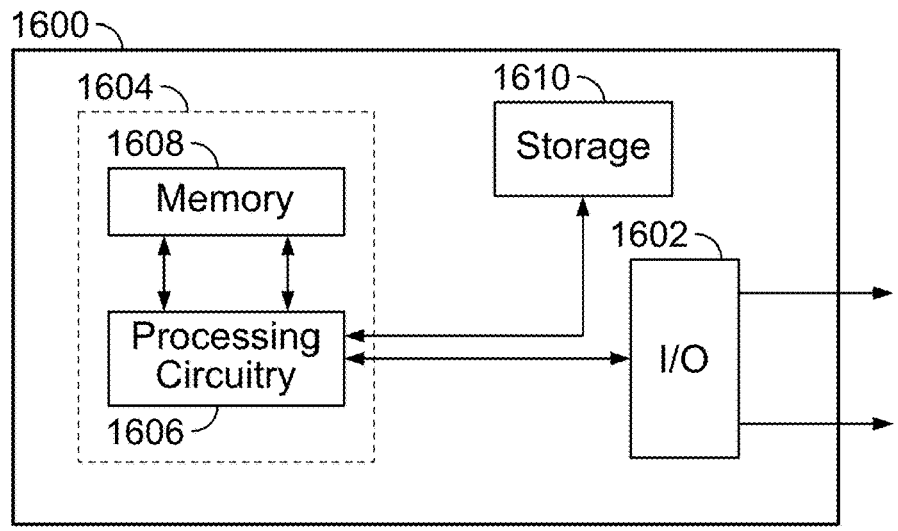
FIG. 16 is a block diagram of a server according to an embodiment.

FIG. 16 depicts a server 1600 that is used to generate metadata indicating potential spoilers. Such a server 1600 may be part of, or in communication with, the content provider 502 shown in FIG. 5.

The server 1600 is configured to receive content and data via I/O path 1602. I/O path 1602 may provide content (e.g., one or more of broadcast programming, on-demand programming, and/or other content) and data to the content provider 502 and/or the user equipment device 504 via the communication network 506, shown in FIG. 5. The server 1600 includes second control circuitry 1604, which includes second processing circuitry 1606 and second memory 1608 (e.g., RAM, ROM, hard disk, removable disk, etc.). Control circuitry 1604 may be used to send and receive requests, and other data, using I/O path 1602. Additional storage 1610 may be included, for example, for storing media assets, and/or data relating to such media assets.

The second control circuitry 1604 may include any suitable second processing circuitry 1606, such as circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The control circuitry 1604 executes instructions for an application stored in the memory 1608. Specifically, control circuitry 604, 712 may be instructed by applications to perform the functions such as the server functions in client-server applications discussed above, and/or the metadata generation process described below.

The second control circuitry 1604 includes communications circuitry suitable for communicating with networks and servers. The communications circuitry may include a cable modem, an integrated services digital network (ISDN) modem, a digital subscriber line (DSL) modem, a telephone modem, Ethernet card, or a wireless modem for communications with other equipment, or any other suitable communications circuitry via the one or more communication networks 506.

Figure 17:
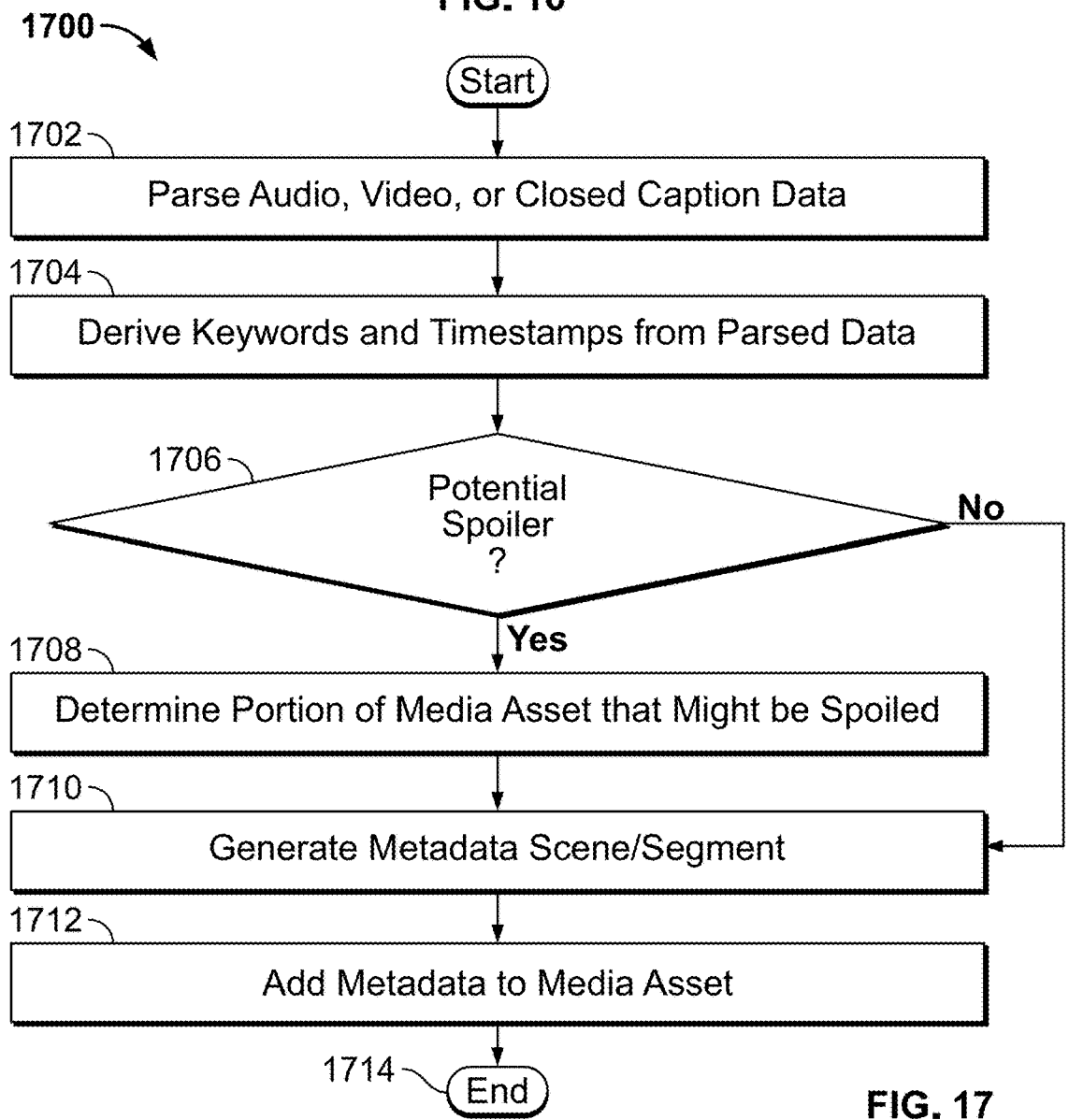
FIG. 17 is a flowchart of a method of providing metadata for use in providing preview images, according to an embodiment.
Figure 18:
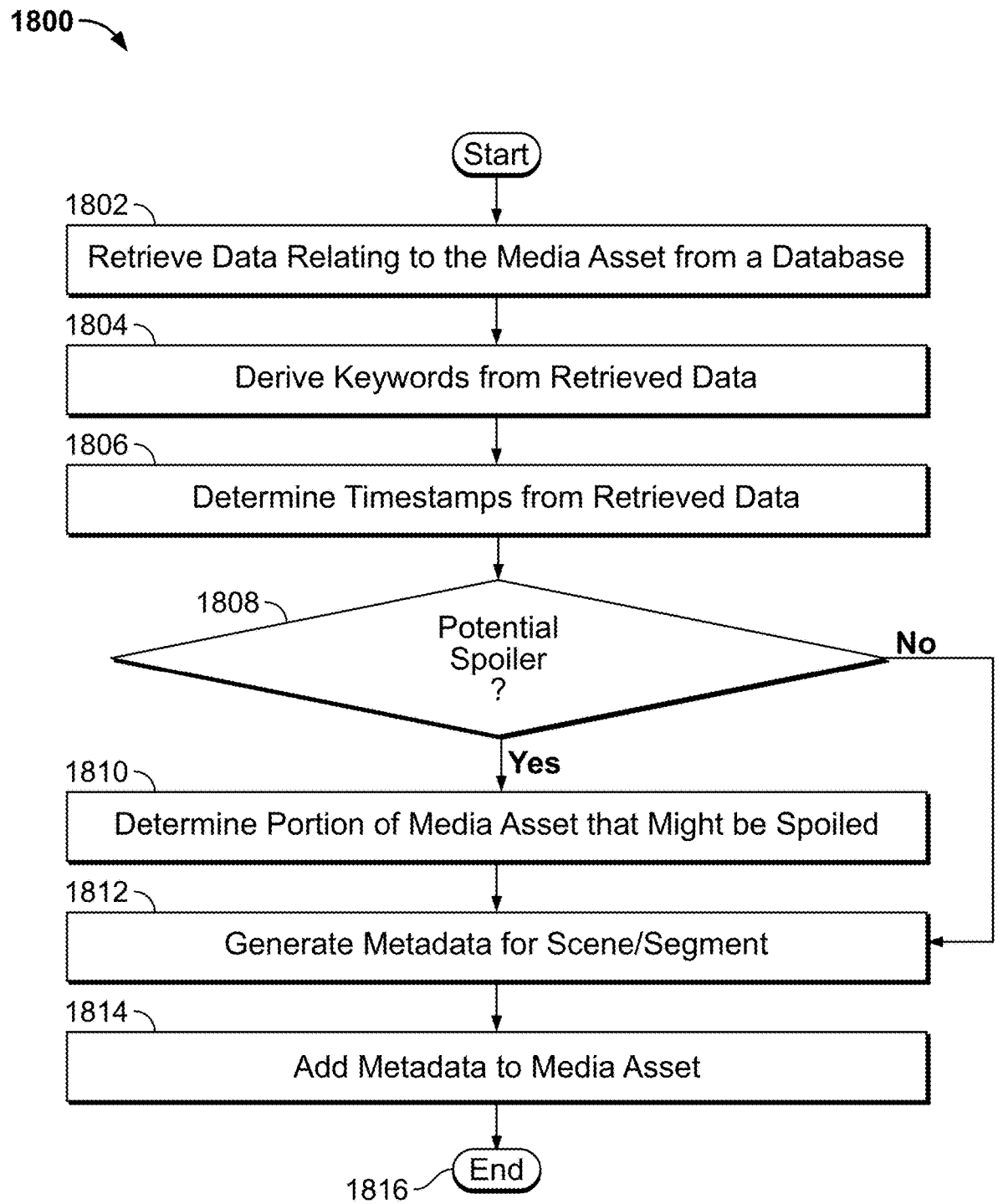
FIG. 18 is a flowchart of a method of providing metadata for use in providing preview images, according to another embodiment.

FIGS. 17 and 18 depict respective processes for providing metadata relating to a scene or segment of the media asset 102. Such metadata is provided with the media asset 102 for use, by a user equipment device 504, in determining whether a preview image should be replaced with an alternative preview image (FIG. 8, step 806), and/or whether a previous alternative preview image is still required (FIG. 11, step 1106).

The process of FIG. 17 begins at step 1700. At least one of audio data, video data, or closed-caption data of the media asset 102 is parsed (step 1702) by the second control circuitry 1604. The second control circuitry 1604 then analyzes the parsed data and extracts, or otherwise derives, keywords from the parsed data for scenes and/or segments of the media asset (step 1704) together with respective timestamps for the scenes and/or segments. Such keywords may include characters or actors appearing in the scene or segment, keywords that indicate an event or type of event occurring in the scene, or keywords indicative of a topic or type of scene.

The second control circuitry 1604 then determines whether the scene or segment might provide a spoiler (step 1706), based on the keywords and timestamps of the scene or segment and keywords of scenes or segments with earlier timestamps.

If it is determined that there is a spoiler (step 1706) then, optionally, the second control circuitry 1604 may determine a portion of the media asset that might be spoiled by a preview image taken from the scene or segment (step 1708). Such a determination may be based on the keywords of the scene or segment and the keywords of scenes or segments with earlier timestamps, and the time information may be based on the timestamps of the scene or segment and/or the timestamps of those earlier scenes. For example, in the media asset corresponding to the progress bar 900 shown in FIG. 10, metadata for a scene containing play position 908 may indicate that the corresponding preview image may provide a spoiler if a current play position is between the start of the media asset and play position 906.

If it is not determined that there is a spoiler (step 1706), then the process continues directly to step 1710.

At step 1710, the second control circuitry 1604 generates metadata for the scene or segment that indicates the presence of a potential spoiler and, where determined, the portion of the media asset. Optionally, the metadata may further include the keywords for use in methods that modify preview images based on user preferences.

The generated metadata is then added to the metadata for the media asset 102 (step 1712), and the process ends (step 1714).

The process of FIG. 18 begins at step 1800. The second control circuitry 1604 accesses a database 508 and retrieves, from the database 508, data relating to the media asset 102 (step 1802). The database 508 may be a database containing plot summaries of media assets, a website, such as the Internet Movie Database, that provides plot summaries and/or reviews of media assets, or a collection of social media posts or forum discussions that tag or mention particular media assets.

The second control circuitry 1604 then retrieves, from the database 508, any of text, audio data, or video data relating to the media asset 102 and extracts, or otherwise derives, from the retrieved data, keywords for scenes and/or segments of the media asset (step 1804) together with words or data indicating timestamps for those scenes and/or segments. Such keywords may include characters or actors appearing in the scene or segment, keywords that indicate an event or type of event occurring in the scene, or keywords indicative of a topic or type of scene.

The second control circuitry 1604 then determines timestamps based on the indicative words or data (step 1806). For example, the retrieved data may indicate that a particular event occurs in a scene "after an hour," or "halfway through" the media asset 102, or "before" or "after" another scene that can be identified from derived keywords. The second control circuitry 1604 may determine a timestamp for the scene containing the event based on such indications.

The second control circuitry 1604 then determines whether the scene or segment might provide a spoiler (step 1808), based on the derived keywords and determined timestamps of the scene or segment and keywords of scenes or segments having earlier determined timestamps.

If it is determined that there is a spoiler (step 1808) then, optionally, the second control circuitry 1604 may determine a portion of the media asset that might be spoiled by a preview image taken from the scene or segment (step 1810). The portion may be determined in a similar manner to that described above, in relation to step 1708 of FIG. 17.

If it is not determined that there is a spoiler (step 1808), then the process continues directly to step 1812.

At step 1812, the second control circuitry 1604 generates metadata for the scene or segment that indicates the presence of a potential spoiler and, if determined, the portion of the media asset. Optionally, the metadata may further include the keywords for use in methods that modify preview images based on user preferences.

The generated metadata is then added to the metadata for the media asset 102 (step 1814), and the process ends (step 1816).

Either of the processes shown in FIGS. 17 and 18 may be used to provide such metadata for the media asset 102, as described above. Alternatively, the processes in FIGS. 17 and 18 may be combined. For example, initial metadata may be generated by the process of FIG. 17, and the process of FIG. 18 used at one or more subsequent times to update that metadata.

In other embodiments, the metadata identifying potential spoilers may be produced manually, through human review of the media asset 102 and generation of the relevant metadata. Alternatively, or additionally, a manual review of the metadata generated by the process of FIG. 17 and/or FIG. 18 may be performed to check its accuracy.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. For example, while the flowcharts of FIGS. 8 and 10 depict a process in which control circuitry 604 displays the media asset prior to identifying the preview images, in other embodiments, the display step may be omitted, for example, where a user is starting to view the media asset 102 and the current play position is the beginning of the media asset 102, or, alternatively, where the user has previously viewed the media asset 102 using another user equipment device, in which the case the current play position may be determined based on a viewing history of the user. Another example in which the initial display of the media asset 102 may be omitted from processes such as those shown in FIGS. 8 and 10 is where the user is viewing preview images for multiple media assets, such as episodes of a series, and the preview image(s) may relate to a subsequent episode to one that has been viewed, or is being viewed, by the user.

More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating for display, using control circuitry, a media asset;
   identifying, using the control circuitry, at least one preview image corresponding to a respective play position in either the media asset or a series including the media asset, where the respective play position is advanced with respect to a current play position in the media asset;
   determining, using the control circuitry, that an alternative preview image is to be displayed in place of the at least one preview image, based on the current play position and metadata associated with the media asset, wherein the metadata indicates a risk of spoiler information contained in the alternative preview image;
   obtaining the alternative preview image by modifying, using the control circuitry, a portion of the at least one preview image to remove or mask a portion of the at least one preview image containing spoiler information, wherein less than the entire preview image is masked or removed; and
   in response to determining that the alternative preview image is to be displayed, generating for display, using the control circuitry, the alternative preview image in place of the at least one preview image.

2. The method of claim 1, comprising, subsequent to the generating for display the alternative preview image:
   determining, using the control circuitry, that the at least one preview image corresponds to content of the media asset at a respective play position that is advanced with respect to an updated current play position;
   determining, using the control circuitry, that the at least one preview image is to be displayed in place of the alternative preview image, based on the updated current play position and the metadata associated with the media asset; and generating for display, using the control circuitry, the at least one preview image in place of the alternative preview image.

3. The method of claim 1, further comprising, subsequent to generating for display the alternative preview image:

determining, using the control circuitry, that the alternative preview image corresponds to content of the media asset at a respective play position that is advanced with respect to an updated current play position;

determining, using the control circuitry, that a second alternative preview image is to be displayed in place of the alternative preview image, based on the updated current play position and the metadata associated with the media asset; and generating for display, using the control circuitry, the second alternative preview image in place of the alternative preview image.

4. The method of claim 1, wherein determining that the alternative preview image is to be displayed in place of the at least one preview image comprises:

determining, based on the metadata, that the at least one preview image contains a spoiler relating to content of the media asset between the current play position and the respective play position.

5. The method of claim 1, further comprising retrieving, using the control circuitry, a user preference from a profile of the user, wherein determining that the alternative preview image is to be displayed in place of the at least one preview image is further based on said user preference.

6. The method of claim 5, further comprising:

monitoring, using the control circuitry, user interactions with a media application that ceased playing of segments of previously viewed media assets;

determining, using the control circuitry, characteristics of the segments of the previously viewed media assets in which playing ceased; and using the control circuitry, storing the user preference, in the profile, the user preference being based on the characteristics of the segments;

wherein determining that the alternative preview image is to be displayed in place of the at least one preview image is based on the metadata indicating that a characteristic of the preview image matches one of the characteristics of the segments.

7. The method of claim 1, further comprising:

generating for display, using the control circuitry, a progress bar for display with the alternative preview image;

wherein the progress bar includes a visual indication of the current play position, and visual indications of the respective play positions; and wherein the visual indication of the respective play position corresponding to the alternative preview image is visually distinguished from one or more respective play positions corresponding to one or more unmodified preview images.

8. The method of claim 1, further comprising:

retrieving, from a server, using second control circuitry, text, audio or video data relating to the media asset;

using the second control circuitry, parsing the retrieved data to identify one or more keywords relating to the media asset;

using the second control circuitry, identifying, based on the metadata, a segment of the media asset related to the identified one or more keywords;

adding to the metadata, using the second control circuitry, an indication that an alternative preview image should be generated for display in place of a preview image corresponding to a play position within the identified segment.

9. The method of claim 1, further comprising:

using second control circuitry, parsing audio data, video data or closed caption data of the media asset;

using the second control circuitry, identifying, based on the parsed data, an event shown in the media asset at a particular play position; and adding to the metadata, using the second control circuitry, an indication that an alternative preview image should be generated for display in place of one or more preview images corresponding to play positions subsequent to the particular play position.

10. A non-transitory computer-readable medium on which is stored:

computer-readable instructions for generating for display a media asset;

computer-readable instructions for identifying at least one preview image corresponding to a respective play position in the media asset that is advanced with respect to a current play position in the media asset;

computer-readable instructions for determining that an alternative preview image is to be displayed in place of the at least one preview image, based on the current play position and metadata associated with the media asset, wherein the metadata indicates a risk of spoiler information contained in the alternative preview image;

computer-readable instructions for obtaining the alternative preview image by modifying, using control circuitry, a portion of the at least one preview image to remove or mask a portion of the at least one preview image containing spoiler information , wherein less than the entire preview image is masked or removed; and computer-readable instructions for, in response to determining that the alternative preview image is to be displayed, generating for display the at least one alternative preview image in place of the at least one preview image.

11. An apparatus comprising:

control circuitry configured to:

generate for display a media asset;

identify at least one preview image corresponding to a respective play position in either the media asset or in a series including the media asset, where the respective play position is advanced with respect to a current play position in the media asset;

determine that an alternative preview image is to be displayed in place of the at least one preview image, based on the current play position and metadata associated with the media asset, wherein the metadata indicates a risk of spoiler information contained in the alternative preview image;

obtain the alternative preview image by modifying a portion of the at least one preview image to remove or mask a portion of the at least one preview image containing spoiler information, wherein less than the entire preview image is masked or removed; and in response to determining that the alternative preview image is to be displayed, generate for display the alternative preview image in place of the at least one preview image.

12. The apparatus of claim 11, wherein the control circuitry is further configured to:

determine, subsequent to generating for display the alternative preview image, that the at least one preview image corresponds to content of the media asset at a respective play position that is advanced with respect to an updated current play position;

determine that the at least one preview image is to be displayed, in place of the alternative preview image, based on the updated current play position and the metadata associated with the media asset; and generate for display the at least one preview image in place of the alternative preview image.

13. The apparatus of claim 11, wherein the control circuitry is further configured to:

determine, subsequent to generating for display the alternative preview image, that the alternative preview image corresponds to content of the media asset at a respective play position that is advanced with respect to an updated current play position;

determine that a second alternative preview image is to be displayed in place of the alternative preview image, based on the updated current play position and the metadata associated with the media asset; and generate for display the second alternative preview image in place of the alternative preview image.

14. The apparatus of claim 11, wherein the control circuitry is configured to determine that a modified preview image is to be displayed in place of the at least one preview image by determining, based on the metadata, that the at least one preview image contains a spoiler relating to content of the media asset between the current play position and the respective play position.

15. The apparatus of claim 11, wherein the control circuitry is configured to:

monitor user interactions with a media application that ceased playing of segments of previously viewed media assets;

determine characteristics of the segments of the previously viewed media assets in which playing ceased; and store a user preference in a profile, the user preference being based on the characteristics of the segments;

wherein the control circuitry is configured to determine that the alternative preview image is to be displayed in place of the at least one preview image is based on the metadata indicating that a characteristic of the preview image matches one of a corresponding characteristic of the segments.

16. The apparatus of claim 11, further comprising:

generating for display, with the modified preview image, a progress bar;

wherein the progress bar includes a visual indication of the current play position, and visual indications of the respective play positions; and wherein the visual indication of the respective play position corresponding to the alternative preview image is visually distinguished from one or more respective play positions corresponding to unmodified preview images.

17. A system comprising:

the apparatus of claim 11; and a second apparatus comprising second control circuitry configured to:

retrieve, from a server, text, audio or video data relating to the media asset;

parse the retrieved data to identify one or more keywords relating to the media asset;

identify, based on the metadata, a segment of the media asset related to the identified one or more keywords;

add, to the metadata, an indication that an alternative preview image should be displayed in place of a preview image corresponding to a play position within the identified segment; and provide the media asset and the metadata to the apparatus.

18. A system comprising:

the apparatus of claim 11; and a second apparatus comprising second control circuitry configured to:

parse audio data, video data or closed caption data of the media asset;

identify, based on the parsed data, an event shown in the media asset at a particular play position;

add, to the metadata, an indication that an alternative preview image should be generated for display in place of one or more preview images corresponding to one or more play positions subsequent to the particular play position; and provide the media asset and the metadata to the apparatus.

* * * * *